(12) United States Patent
Kusserow

(10) Patent No.: US 9,856,108 B2
(45) Date of Patent: Jan. 2, 2018

(54) COMMUNICATION METHOD AND APPARATUS FOR AN ELEVATOR SYSTEM

(71) Applicant: Inventio AG, Hergiswil NW (CH)

(72) Inventor: Martin Kusserow, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 14/910,034

(22) PCT Filed: Jul. 30, 2014

(86) PCT No.: PCT/EP2014/066337
§ 371 (c)(1),
(2) Date: Feb. 4, 2016

(87) PCT Pub. No.: WO2015/018697
PCT Pub. Date: Feb. 12, 2015

(65) Prior Publication Data
US 2016/0185568 A1 Jun. 30, 2016

(30) Foreign Application Priority Data
Aug. 9, 2013 (EP) ..................................... 13179845

(51) Int. Cl.
*G05B 23/02* (2006.01)
*B66B 1/34* (2006.01)
(Continued)

(52) U.S. Cl.
CPC .......... *B66B 1/3453* (2013.01); *B66B 1/3446* (2013.01); *H04L 67/12* (2013.01);
(Continued)

(58) Field of Classification Search
CPC .. H04W 52/0203; H04W 4/043; H04L 67/12; B66B 1/3453; B66B 1/3446
(Continued)

(56) References Cited

U.S. PATENT DOCUMENTS 6,446,761 B1 9/2002 Motoyama et al.
7,426,981 B2 9/2008 Bacellar et al.
(Continued)

FOREIGN PATENT DOCUMENTS

| CN | 1297842 A | 6/2001 |
|---|---|---|
| EP | 1415947 A1 | 5/2004 |
| JP | 2009215060 A | 9/2009 |

*Primary Examiner* — Dhaval Patel
(74) *Attorney, Agent, or Firm* — William J. Clemens; Shumaker, Loop & Kendrick, LLP

(57) ABSTRACT

A method and an apparatus for interchanging data between at least one sensor unit arranged in an elevator shaft of an elevator system and a monitoring unit of a service center which is locally remote from the elevator system, wherein an elevator car which moves vertically in the elevator shaft, include a first communication unit arranged at the elevator car. Data are transmitted from the at least one sensor unit to the first communication unit via a first communications network on the basis of the position of the elevator car and are stored by the first communication unit. The stored data are transmitted from the first communication unit to a second communication unit on the basis of at least one rule and are transmitted from the second communication unit to the monitoring unit via a second communications network.

9 Claims, 2 Drawing Sheets

(51) Int. Cl.
*H04L 29/08* (2006.01)
*H04W 4/04* (2009.01)
*H04W 52/02* (2009.01)

(52) U.S. Cl.
CPC ....... *H04W 4/043* (2013.01); *H04W 52/0203* (2013.01); *Y02B 60/50* (2013.01)

(58) Field of Classification Search
USPC ........ 340/3.31, 5.6, 340; 187/247, 249, 251, 187/393, 394, 313, 287, 289, 382
See application file for complete search history.

(56) References Cited

U.S. PATENT DOCUMENTS

| | | | |
|---|---|---|---|
| 8,253,548 B2 | 8/2012 | Oh et al. | |
| 2003/0047390 A1* | 3/2003 | Crenella | B66B 1/34 |
| | | | 187/395 |
| 2007/0041352 A1 | 2/2007 | Frankel et al. | |
| 2011/0168496 A1* | 7/2011 | Bunter | B66B 5/0025 |
| | | | 187/247 |
| 2011/0315490 A1* | 12/2011 | Shi | B66B 5/0025 |
| | | | 187/393 |

* cited by examiner

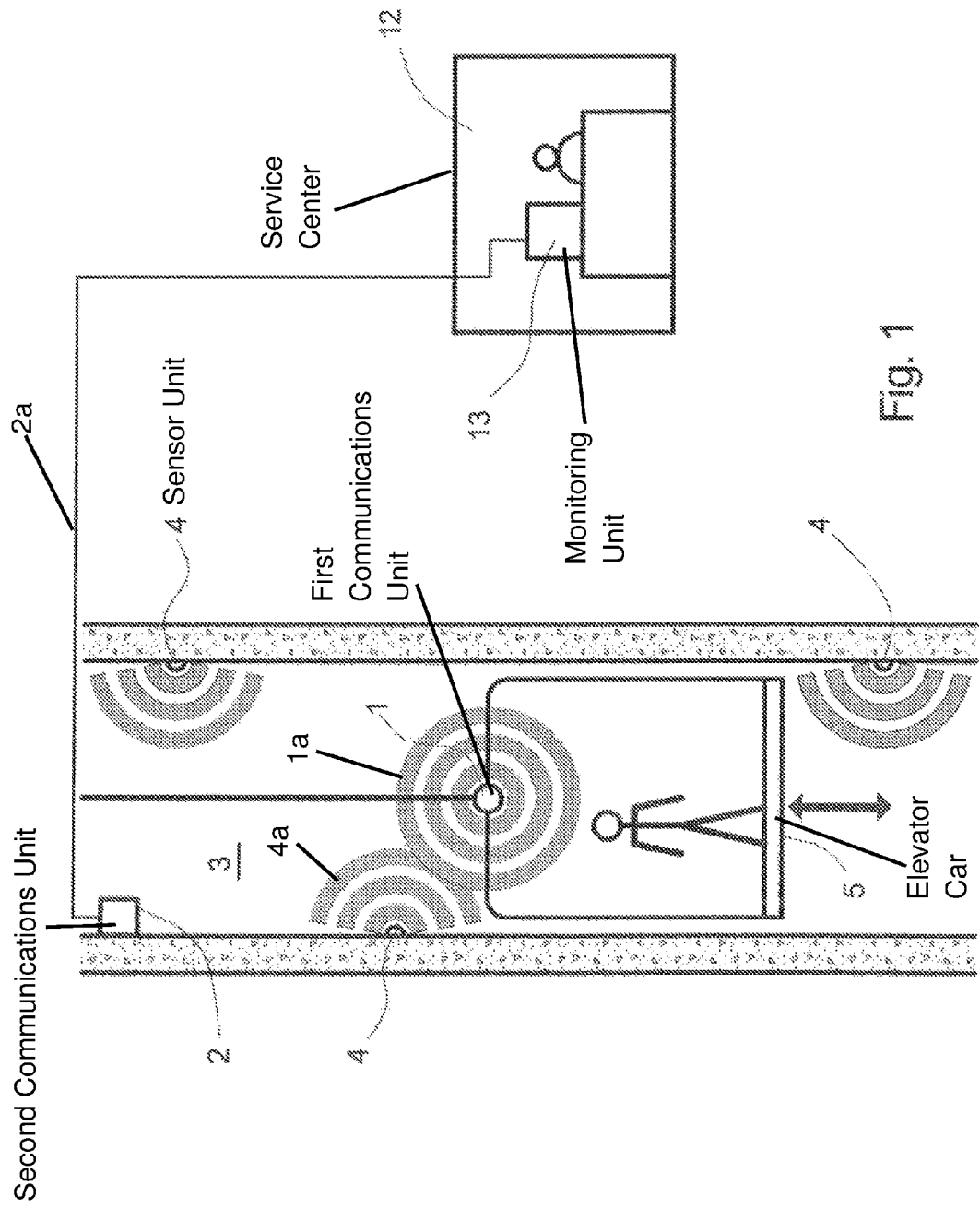

COMMUNICATION METHOD AND APPARATUS FOR AN ELEVATOR SYSTEM

FIELD

The invention relates to a method of and a device for exchange of data between at least one sensor unit, which is arranged in an elevator shaft of an elevator installation, and a monitoring unit, which is positionally remote from the elevator installation, of a service center, wherein an elevator car which moves vertically in the elevator shaft and at which a first communications unit is arranged is used in the elevator installation.

BACKGROUND

The document U.S. Pat. No. 8,253,548 B2 describes an elevator system with an elevator control unit which exchanges data with an elevator control by a non-wired connection. The elevator control unit also exchanges data with a display unit.

The document U.S. Pat. No. 7,426,981 B2 describes an elevator system with Piconet modules, which exchange data by way of a communications network (Bluetooth) with a non-wired connection. A mobile communications terminal apparatus, which is connected with the communications network having a non-wired connection and which comprises a Piconet module, can in that case acquire data of the elevator installation by transmission.

The document US 2007/0041352 A1 describes a method for detecting the location of an elevator control unit from which a call request has been made. The location of the elevator control unit is determined in a mobile communications network on the basis of the signal strength and the elevator car is dispatched to the corresponding floor of the elevator control unit.

The document EP 1415947 A1 discloses a device for remote maintenance and monitoring of an elevator installation with at least one input for detection of first signals from an elevator control and/or from a sensor with at least one output of second signals to a telecommunications network and with at least one processor and data memory, wherein a set of remote maintenance functions is stored in the data memory and wherein one of these remote maintenance functions is activatable. Data from a sensor or the elevator control are permanently transferred by way of the telecommunications network to a service center.

In elevator installations, use is frequently made of a point-to-point connection or a multi-hop method for a non-wired connection or mobile communication. By point-to-point connection there is to be understood in telecommunications a direct connection without intermediate stations. By contrast, in the case of a multi-hop method data are transferred by way of intermediate stations. The transfer from one station to the next is called hop. In general, distinction is made between single (or simple) hop connections in which exactly one station or hop lies between transmitter and receiver and multi-hop connections in which the data (packets) are passed on by way of several intermediate stations. In multi-hop communications networks reference is also made to the n-hop proximity of a station, wherein n is replaced by a natural number. These are all network junctions which can be reached from the intermediate station under consideration by way of at most n hops. The hop number is the number of steps which a packet has to cover on the route from the transmitter to the receiver, wherein the number of intermediate stations lying along this path is smaller by one.

A disadvantage of such a method is that such communication networks need a substantial radio range and antenna power so that a secure communication can be guaranteed. In addition, use is frequently made of complex network protocols which generate a high traffic load due to security requirements in the transmission of data. Thus, a more secure and reliable connection set-up, i.e. a reliable delivery of data packets and guarantee of fault-free transmission between the units participating in the communication, can indeed be ensured, but the (communications) units have a high energy consumption due to network protocols of that kind.

SUMMARY

An object of the invention is to propose a simple and energy-efficient communications method for an elevator installation.

A core of the invention is to be seen in that, in the case of an elevator installation, data are transmitted by at least one sensor unit to a first communications unit, which is arranged at an elevator car, via a first communications network in dependence on the position of the elevator car and are stored by the first communications unit. The stored data are transmitted by the first communications unit to a second communications unit in dependence on at least one rule and finally the second communications unit transmits or sends the data to a monitoring unit of a service center via a second communications network.

The at least one sensor unit is in that case arranged in an elevator shaft of the elevator installation. The elevator car with the first communications unit travels in this elevator shaft vertically between the floors of a building. The monitoring unit of a service center is disposed at a location remote from the elevator installation.

The radio range of the at least one sensor unit can be selected so that it approximately corresponds with the cross-section of the elevator shaft. The cross-section of the elevator shaft basically corresponds with the plan area bounded by the side walls. In the case of elevator installations with several elevator cars, which travel adjacent to one another, in an elevator shaft the cross-section is determined in each instance for one elevator car. In the case of three elevator cars travelling adjacent to one another in an elevator shaft there are, for example, three virtual elevator shafts with three cross-sections. It can be ensured by the thus-selected radio range that the first communications unit, which is arranged at the elevator car, can bi-directionally exchange data with the at least one sensor unit. Since it is provided in accordance with the invention that the first communications unit transmits the data—which originates from the at least one sensor unit—to the second communications unit, the second communications unit can lie outside the radio range of the at least one sensor unit. The arrangement of the first communications unit at the elevator car is to be selected so that a communications connection can be established between the at least one sensor unit and the first communications unit.

The second communications unit can be connected with the monitoring unit of a service center by way of a (public) wire-connected or non-wire-connected communications network, i.e. use can be made of a landline network (also PSTN=public switched telephone network) or a packet-switching mobile telephone network. The connection can be present permanently or when required.

As the first communications network, i.e. for the connection between the at least one sensor unit and the first communications unit, use can be made of any communications network with a non-wired connection. Thus, for example, a near-field communication, a Bluetooth connection, a WLAN connection (wireless local area network=wire-free local network), etc., are conceivable.

The first communications unit transmits the data to the second communications unit in dependence on at least one rule. Thus, a transmission could take place only when a pre-defined data volume is reached. In addition, the data could also be transmitted in dependence on a priority. Data with lower priority, for example air pressure values, are transmitted with a delay in time and data with higher priority, for example values of a door switching unit, are transmitted immediately. In addition, criteria such as safety requirement criteria, a clock time, a time delay, a signal strength, a transmission time, a radio range, etc., can also be used for definition of at least one rule.

The data from the at least one sensor unit can be transmitted to the first communications unit when the elevator car travels past the at least one sensor unit or the first communications unit is in the vicinity of the at least one sensor unit. As vicinity of the at least one sensor unit there is defined the spacing between the first communications unit and the at least one sensor unit. Ideally, this spacing is as small as possible so that, inter alia, a smallest possible transmission power is needed and this helps minimize the energy consumption of the at least one sensor unit. This means, in particular, that only a temporary communications connection is established between the at least one sensor unit and the first communications unit, namely only whenever the elevator car moves past the at least one sensor or is disposed in its vicinity or in its radio range.

The first and/or second communications unit can be integrated in an elevator control unit or designed as a separate unit. The first communications unit comprises at least one communications module for (bi-directional) exchange or for reception and transmission and a memory unit for storage of data. The second communications unit comprises at least one communications module for (bi-directional) exchange or for reception and transmission of data.

The at least one sensor unit can be of any kind. Thus, use can be made of an acceleration sensor, a temperature sensor, an air pressure sensor, a current sensor, a voltage sensor, a light sensor, a humidity sensor, a door contact unit, a safety unit, a weight sensor, a speed sensor, a force sensor, a magnetic field sensor, a gyroscope, a position sensor, etc. In addition, the at least one sensor unit comprises a communications module for transmission and reception of data. As data, use can be made of a signal, at least one value, a plot, etc.

The second communications unit can be arranged in the vicinity of the shaft head. However, it can also be installed at a different place in the shaft or engine room.

An advantage of the invention is that the radio range of the at least one sensor unit has to extend only to such an extent that the first communications unit can exchange data therewith. As a result, energy consumption can be minimized. Thus, the at least one sensor unit could be supplied with energy independently of a power mains, for example by a battery, a condenser or in any other way, such as, for example, by way of induction, piezo elements, photovoltaic means, etc.

A further advantage is to be seen in that technical limitations imposed by the building with respect to communication with a monitoring unit of a service center can be overcome in a simple manner without cost-intensive communications units having to be installed or the building having to be changed, for example by drilling, cabling, etc.

DESCRIPTION OF THE DRAWINGS

The invention is explained in more detail by way of an embodiment illustrated in the figures, in which:

FIG. 1 shows a schematic illustration of an elevator installation according to the invention.

DETAILED DESCRIPTION

Figure 3:
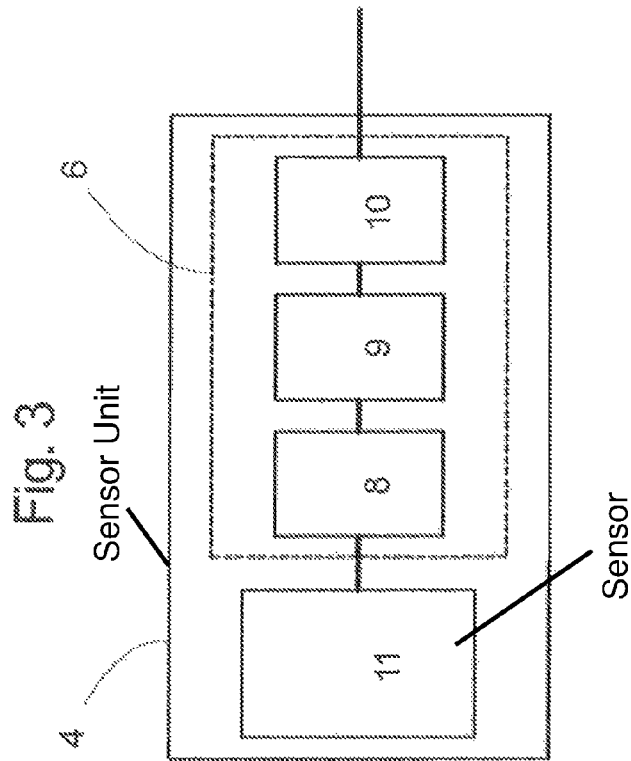
FIG. 2 shows a simplified illustration of a communications unit and FIG. 3 shows an example of a sensor unit.

FIG. 1 shows a schematic illustration of an elevator installation according to the invention. The elevator installation comprises an elevator shaft 3 with an elevator car 5 moving vertically between the floors (not illustrated) of a building. In addition, the elevator installation comprises at least one sensor unit 4. In this example, three sensor units 4 are arranged in the elevator shaft 3. Obviously, in accordance with the invention at least one sensor unit 4 could also be mounted on the elevator car 5.

A first communications unit 1 is arranged at the elevator car 5. The first communications unit 1 can in principle be arranged in whatever way desired at the elevator car 5, for example laterally, under or in the elevator car 5. In this example, the first communications unit 1 is mounted on the elevator car roof.

The at least one sensor unit 4 can be designed, depending on the respective form of embodiment, as an acceleration sensor, a temperature sensor, an air pressure sensor, a current sensor, a voltage sensor, a light sensor, a humidity sensor, a weight sensor, a speed sensor, a position sensor, a safety unit, a door contact unit, a switching element, etc.

Data detected by the at least one sensor unit 4, for example a temperature value by a temperature sensor, are transmitted by way of a first communications network to the first communications unit 1 in dependence on the position of the elevator car 5.

The radio ranges of the at least one sensor unit 4 and the first communications unit 1 are indicated by the dashed-line circles or semicircles 4a, 1a respectively thereabound.

The first communications network is designed as a communications network with a non-wired connection. Thus, for example, use could be made of a WLAN network, a Bluetooth network, a near-field communication, a field bus, etc.

For preference, a communications connection between the at least one sensor unit 4 and the first communications unit 1 is established only when the elevator car 5 travels past the at least one sensor unit 4 or is in the vicinity of the at least one sensor unit 4. The radio range 4a of the at least one sensor unit 4 and the radio range 1a of the first communications unit 1 can thereby be minimized. Thus, for example, the radio range 4a of the at least one sensor unit 4 could be selected so that it corresponds with the cross-section of the elevator shaft 3.

Designated in general as radio range is the distance which may at most be present between transmitter and receiver so that a communication is still possible. Thus, a permanent communication connection does not have to be present between the at least one sensor unit 4 and the first communications unit 1. A temporary communication connection is sufficient, for example when the elevator car 5 moves past the at least one sensor unit 4. By virtue of the minimized radio range it is possible, inter alia, to reduce the transmission power, which optimizes the energy consumption not only of the at least one sensor unit 4, but also of the first communications unit 1. It is thereby possible, for example, for the at least one sensor unit 4 not to be connected with the general power supply of the elevator installation. Rather, the at least one sensor unit 4 can be supplied with power by a battery, a condenser or another energy source. Energy supply by way of induction, piezo switching elements, photovoltaic means, etc. is also conceivable.

The first communications unit 1 stores the data, which is transmitted by the at least one sensor unit 4, in a memory unit. For that purpose, the memory unit can be integrated in the first communications unit 1 or can be connected as a separate unit with the first communications unit 1.

The stored data are transmitted from the first communications unit 1 to a second communications unit 2 in dependence on at least one rule. The second communications unit 2 can in that case be arranged in the shaft or an engine room. In this example, the second communications unit 2 is installed in the vicinity of the shaft head.

As the at least one rule, use can be made of, for example, a data volume defined beforehand. Only when a certain amount of data from the first communications unit 1 has been stored does this unit 1 transmit the data to the second communications unit 2. In addition, it can be established by the at least one rule that firstly all sensor units 4—in this example three sensor units—should have transmitted their data to the first communications unit 1 so that the first communications unit 1 passes on the data to the second communications unit 2. Moreover, the data could have a different priority. This means that data with higher priority are transmitted without delay and such with lower priority are transmitted with a delay in time to the second communications unit 2. Further rules could be based on a clock time, safety requirement criteria, a time delay, a (necessary) signal strength relating to radio range, a transmission time of the data, etc.

The second communications unit 2 is connected with a monitoring unit 13 of a service center 12 by way of a second communications network 2a. The second communications network 2a can in that case have a wired or non-wired connection. Thus, for example, use can be made of a public landline (PSTN) or a mobile communications network. The second communications unit 2 transmits the data, which are acquired from the first communications unit 1, via the second communications network 2a to the monitoring unit 13 of the service center 12. The service center 12 is located remotely from the elevator installation.

Figure 2:
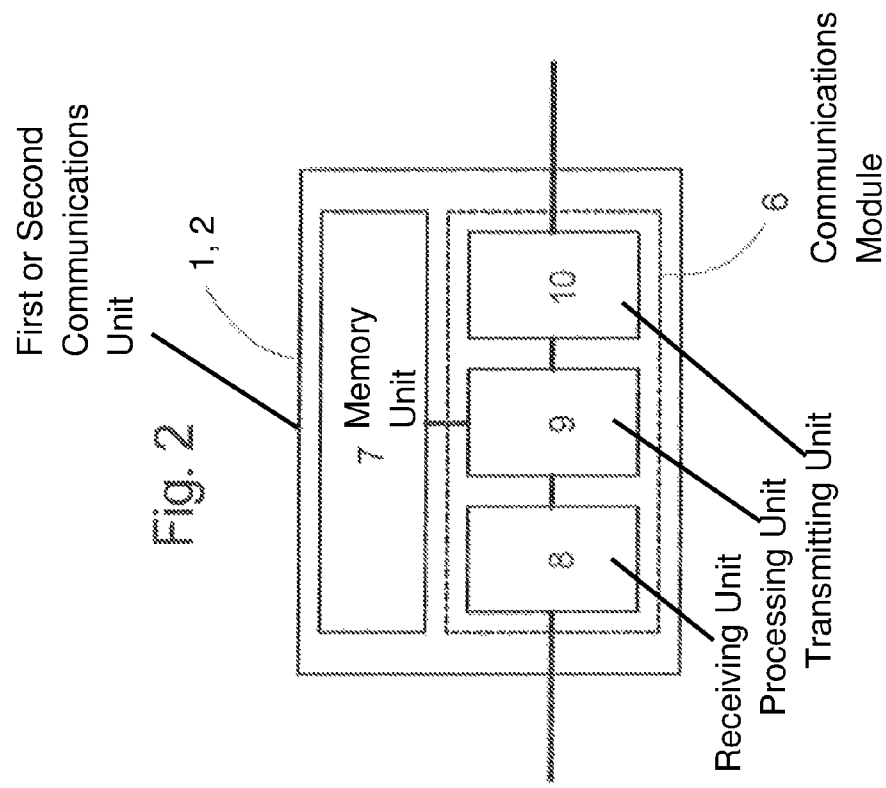

FIG. 2 shows a simplified illustration of a communications unit 1, 2 for carrying out the method according to FIG. 1. The first communications unit 1 and the second communications unit 2 comprise at least one memory unit 7 and a communications module 6 with a receiving unit 8, processing unit 9 and a transmitting unit 10.

FIG. 3 shows an example of a sensor unit 4 for carrying out the method according to FIG. 1. In that case, the sensor unit 4 comprises at least one sensor 11 and a communications module 6 with a receiving unit 8, processing unit 9 and transmitting unit 10. The sensor 11 can also be designed as a sensor, door contact, actuator, safety element or safety switch, etc.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of exchanging data between at least one sensor unit, arranged in an elevator shaft of an elevator installation, and a monitoring unit, positionally remote from the elevator installation, of a service center, wherein an elevator car which travels vertically in the elevator shaft and at which a first communications unit is arranged is used in the elevator installation, comprising the steps of:
   transmitting data by the at least one sensor unit via a first communications network to the first communications unit in dependence on a position of the elevator car in the elevator shaft, the first communications network being a communications network with a non-wired connection, the elevator car being movable relative to the at least one sensor unit, and storing the data by the first communications unit;
   transmitting the stored data by the first communications unit to a second communications unit in dependence on at least one rule, the second communications unit lying outside of a range of the non-wired connection of the first communications network; and
   transmitting the data by the second communications unit to the monitoring unit via a second communications network.

2. The method according to claim 1 wherein the at least one rule is based on at least one of a pre-defined data volume, a priority of the data, a safety requirement criterion, a clock time, a time delay, a signal strength and a transmission time.

3. The method according to claim 1 wherein the second communications network is either a public communications network with a wired connection or a communications network with a non-wired connection.

4. The method according to claim 1 wherein the data are transmitted by the at least one sensor unit when the elevator car with the first communications unit is moved past the at least one sensor unit or is in a vicinity of the at least one sensor unit.

5. The method according to claim 1 wherein at least one of the first communications unit and the second communications unit is integrated in an elevator control unit of the elevator installation or is separate from the elevator control unit.

6. The method according to claim 1 wherein the at least one sensor unit is one of an acceleration sensor, a temperature sensor, an air pressure sensor, a current sensor, a voltage sensor, a light sensor, a humidity sensor, a door contact unit, a safety unit, a weight sensor, a speed sensor and a position sensor.

7. The method according to claim 1 wherein the second communications unit is arranged in a vicinity of a shaft head of the elevator shaft.

8. The method according to claim 1 wherein a radio range of the at least one sensor unit corresponds with a cross-section of the elevator shaft.

9. An apparatus for exchange of data between at least one sensor unit, arranged in an elevator shaft of an elevator installation, and a monitoring unit, positionally remote from the elevator installation, of a service center, wherein the elevator installation includes an elevator car which travels vertically in the elevator shaft and at which a first communications unit is arranged, comprising:
   a first communications network enabling the at least one sensor unit to transmit data to the first communications unit in dependence on a position of the elevator car in the elevator shaft, the first communications network being a communications network with a non-wired connection, and the elevator car being movable relative to the at least one sensor unit;

the first communications unit being configured to store the transmitted data;

a second communications unit lying outside of a range of the non-wired connection of the first communications network, the first communications unit being configured to transmit the stored data to the second communications unit in dependence on at least one rule; and a second communications network enabling the second communications unit to transmit the data to the monitoring unit.

* * * * *